I. A. RANDEL.
PRESSED STEEL JOURNAL BOX.
APPLICATION FILED FEB. 8, 1915.

1,295,598.

Patented Feb. 25, 1919.
3 SHEETS—SHEET 1.

WITNESSES
E. C. Skinkle
A. H. Opsahl

INVENTOR
Ivar A. Randel
BY HIS ATTORNEYS
Williamson Merchant

I. A. RANDEL.
PRESSED STEEL JOURNAL BOX.
APPLICATION FILED FEB. 8, 1915.

1,295,598.

Patented Feb. 25, 1919.
3 SHEETS—SHEET 2.

WITNESSES
E. C. Skinkle
A. H. Opsahl

INVENTOR
Ivar A. Randel
BY HIS ATTORNEYS
Williamson

I. A. RANDEL.
PRESSED STEEL JOURNAL BOX.
APPLICATION FILED FEB. 8, 1915.

1,295,598.

Patented Feb. 25, 1919.
3 SHEETS—SHEET 3.

WITNESSES
E. C. Skinkle
A. H. Opsahl

INVENTOR
Ivar A. Randel
BY HIS ATTORNEYS

UNITED STATES PATENT OFFICE.

IVAR A. RANDEL, OF CHICAGO, ILLINOIS, ASSIGNOR TO McCORD AND COMPANY, OF CHICAGO, ILLINOIS, A CORPORATION OF NEW JERSEY.

PRESSED-STEEL JOURNAL-BOX.

1,295,598.　　　　　Specification of Letters Patent.　　Patented Feb. 25, 1919.

Application filed February 8, 1915. Serial No. 6,710.

*To all whom it may concern:*

Be it known that I, IVAR A. RANDEL, a citizen of the United States, residing at Chicago, in the county of Cook and State of Illinois, have invented certain new and useful Improvements in Pressed-Steel Journal-Boxes; and I do hereby declare the following to be a full, clear, and exact description of the invention, such as will enable others skilled in the art to which it appertains to make and use the same.

My invention has for its object to provide an all pressed steel journal box of great strength and durability which may be commercially made at comparatively small cost. Generally stated, the invention consists of the novel construction and combination of parts hereinafter described and defined in the claims.

In the accompanying drawings which illustrate the invention, like characters indicate like parts throughout the several views.

Referring to the drawings.

Figure 1:
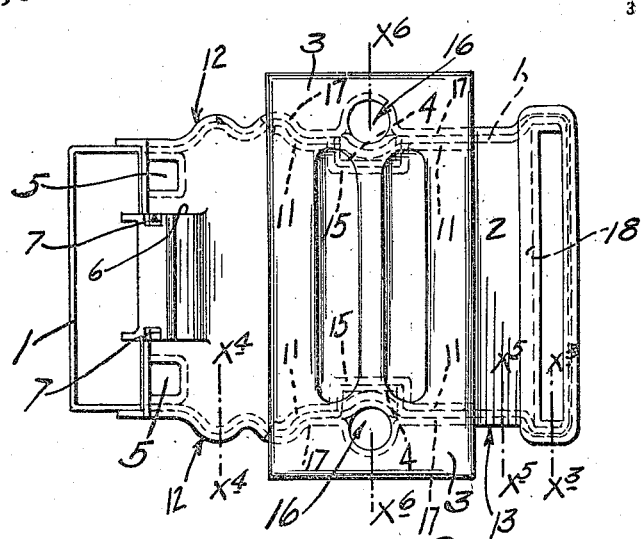
Figure 1 is a plan view of the complete box.
Figure 2:
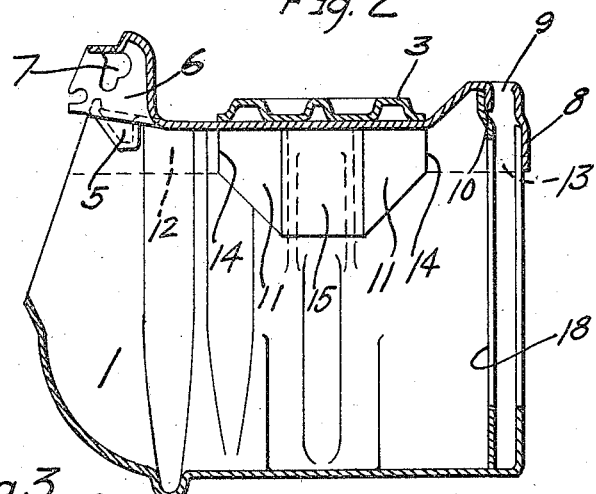
Fig. 2 is a vertical section taken through the box on the line $x^2$ $x^2$ on Fig. 7.
Figures 3, 4, 5:
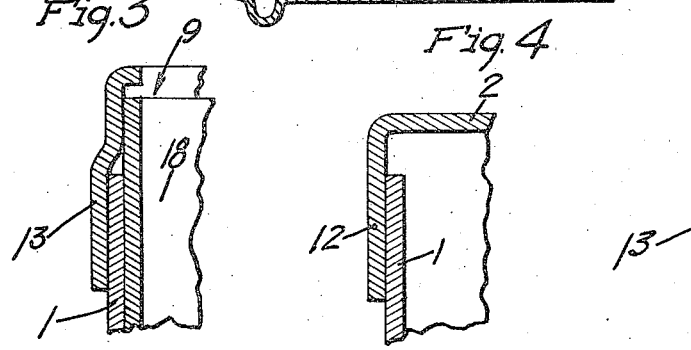
Fig. 3 is a fragmentary detail in section on the line $x^3$ $x^3$ on Fig. 1.
Fig. 4 is a fragmentary section taken on the line $x^4$ $x^4$ on Fig. 1.
Fig. 5 is a fragmentary section taken on the line $x^5$ $x^5$ on Fig. 1.
Figure 6:
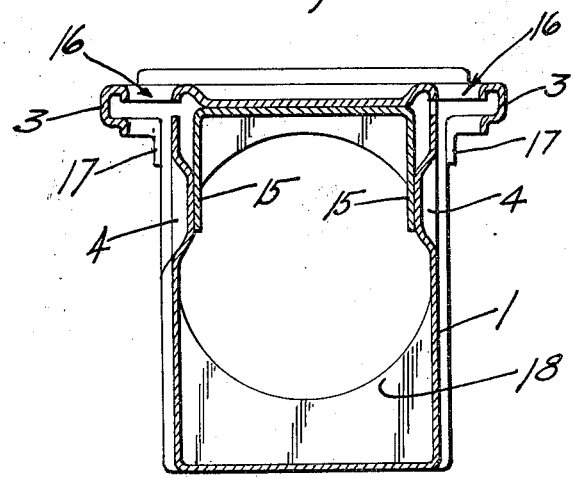
Fig. 6 is a transverse section taken through the box on the line $x^6$ $x^6$ on Fig. 1.
Figure 7:
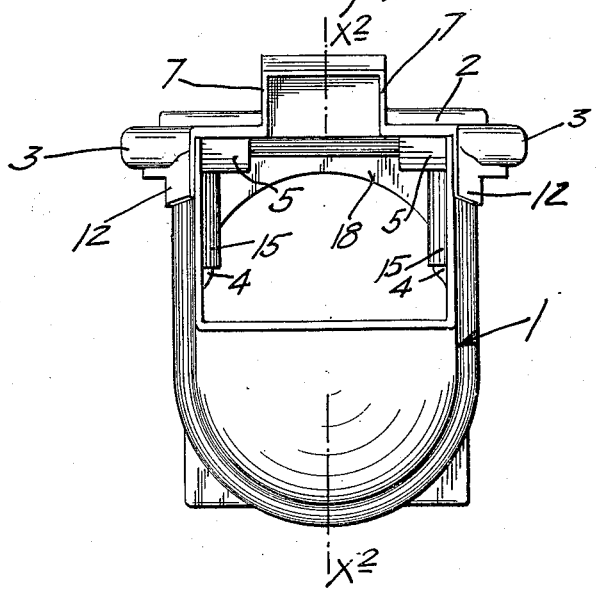
Fig. 7 is an elevation showing the box as it appears when looking at the outer end thereof, or in a direction from left to right, in respect to Figs. 1 and 2.
Figure 8:
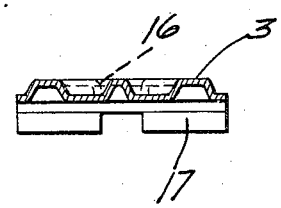
Figs. 8, 9 and 10 are vertical sections on the same line as Fig. 2, showing, respectively, the arch bar seat, the top plate of the box, and the cellar or pressed body of the box, the said parts being separated.
Figure 9:
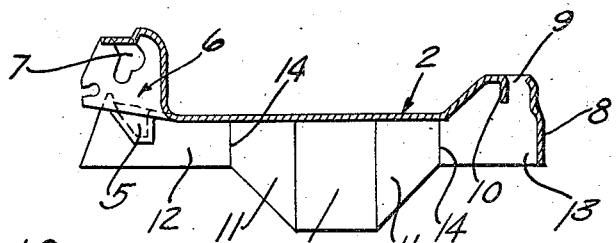
Figure 10:
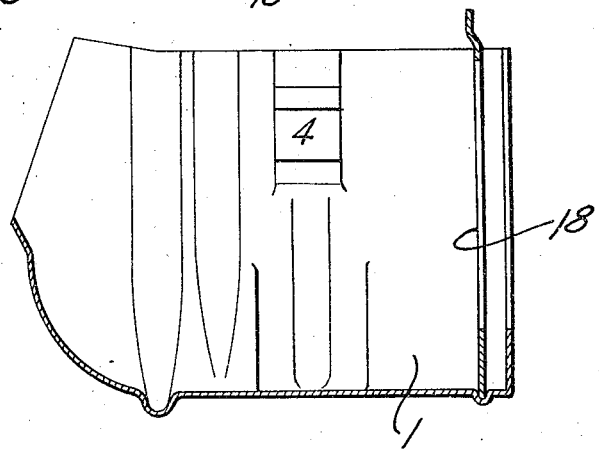

In the preferred construction illustrated in the accompanying drawings, the three elements of the box, to-wit, the cellar, the top and arch bar seating yoke are separately formed, each being pressed from sheet steel of the proper thickness and strength. The pressed steel cellar is indicated as an entirety by the numeral 1. The pressed steel top is indicated as an entirety by the numeral 2 and the pressed steel arch bar seating yoke is indicated by the numeral 3. In the intermediate portions of its sides, near its upper edges, the cellar 1 has depressions or inwardly pressed bosses 4 for a purpose which will presently appear. The top 2 has depressions 5 that afford front wedge stops, and between these wedge stops 5, the said top is formed with a large upward bulge pressed directly from the body thereof, and which affords a hollow lid hinge lug 6. This hinge lug may take various forms but is always an integral part of the top, formed by displacing the sheet metal of the top. Usually, it will have perforations 7 for the lid hinge bolt. At its rear edge, the top 2 has an integral down-turned flange 8 and adjacent thereto, is formed with a dust guard top opening 9 formed by cutting and turning downward a flange 10. At its sides, the top 2 has downturned flanges 11, 12 and 13, that are separated by slits 14, (see Fig. 9). The flanges 13 are formed as outward extensions of the inner end flange 8. The said flanges 12 and 13 are laterally offset from the flanges 11 so that said flanges 12 and 13 are just outside of the upper edge of the box, while the flanges 11 are just inside of the upper edge of the box, but in close contact therewith. The inside flanges 11 are bulged inward to form center brass-stops 15 that are preferably rectangular in cross section. The inward bulges or bosses 4 formed in the sides of the box closely fit into the said brass-stops 15 and thus reinforce the same.

The arch bar seating yoke 3, at its ends, is folded under and inward to provide the required projections beyond the sides of the box, and is formed with flanged holes 16 for the arch bar bolts. The underturned portions of the ends of the said arch bar seat are turned downward to form flanges 17 that closely engage with the sides of the cellar. As shown, the intermediate portion of the arch bar seating yoke 3 has longitudinal depressions that serve to rib or corrugate, and hence, strengthen the same.

The numeral 18 indicates an inside dust guard wall which, in the construction illustrated, is a separate element stamped or cut from sheet steel. Before the top is applied, this wall 18 is inserted into the cellar in proper position to engage at its upper edge with the flange 10 of the top, when the parts are assembled. When the main elements 1, 2 and 3 and also the element 18 (when the latter is independently formed) are assembled, as already indicated, and as shown in Figs. 1 to 7, inclusive, the overlapping or contacting portions of the said elements are rigidly united, preferably by spot welding at appropriate points.

I claim—

1. A journal box having a pressed sheet metal top formed at its inner extremity with a dust guard opening and the said same top plate, at its outer extremity having an upwardly pressed hinge lug.

2. A journal box having a pressed sheet metal top formed with downturned side and inner end flanges, having a dust guard opening therein adjacent to its downturned inner end flange, and the said same top plate having an integral upwardly pressed hinge lug.

3. A journal box having a pressed sheet metal top formed with downturned side and inner end flanges, having a dust guard opening therein adjacent to its downturned inner end flange, and the said same top plate having an integral upwardly pressed hinge lug, and downwardly pressed wedge stops located, one on each side of said hinge lug.

4. A journal box having a separately formed pressed metal arch bar seating yoke.

5. A pressed steel journal box having a separately-formed pressed steel arch bar seating yoke.

6. A pressed steel journal box having a separately-formed pressed steel arch bar seating yoke with end portions projected beyond the sides of the box and bent under and backward against the sides of the box, the said projecting ends having column bolt passages.

7. A pressed steel journal box comprising a pressed steel cellar, independently formed pressed steel top, and an independently formed arch bar seating yoke, the said parts being assembled and rigidly united.

8. A pressed steel journal box comprising a pressed steel cellar and an independently formed pressed steel top, said cellar and top having overlapped flanges, said top having a lid hinge lug pressed upward from its outer end portion and having a dust guard opening at its inner end portion, the sides of said cellar and the depending side flanges of said top having closely engaged approximately rectangular inwardly-pressed bosses affording center brass-stops.

9. A pressed steel journal box comprising a pressed steel cellar and a pressed steel top, the said top having depending side flanges offset laterally so that some thereof engage the inner and some the outer surfaces of the sides of the box.

10. A pressed steel journal box comprising a pressed steel cellar and a pressed steel top, the said top having depending side flanges offset laterally so that some thereof engage the inner and some the outer surfaces of the sides of the box, said top further having an upwardly pressed lid hinge lug at its outer portion and a dust guard opening at its inner end portion.

11. A pressed steel journal box comprising a pressed steel cellar and a pressed steel top, the said top having depending side flanges offset laterally so that some thereof engage the inner and some the outer surfaces of the sides of the box, said top further having an upwardly pressed lid hinge lug at its outer portion, a dust guard opening at its inner end portion and depressed outer wedge stops, one on each side of said hinge lug, the depending flanges of said top and the sides of said cellar having engaged inwardly pressed portions affording center brass-stops.

12. A journal box having a separately formed arch bar seating yoke.

In testimony whereof I affix my signature in presence of two witnesses.

IVAR A. RANDEL.

Witnesses:
C. J. COPELAND,
C. W. RUDOLPH.

Copies of this patent may be obtained for five cents each, by addressing the "Commissioner of Patents, Washington, D. C."